United States Patent [19]

Crum

[11] 4,042,065
[45] Aug. 16, 1977

[54] TRACK LINK HINGE JOINT LUBRICATING SYSTEM

[75] Inventor: Robert L. Crum, Springfield, Ill.

[73] Assignee: Fiat-Allis Construction Machinery, Inc., Deerfield, Ill.

[21] Appl. No.: 640,255

[22] Filed: Dec. 12, 1975

[51] Int. Cl.² .............................................. F01M 1/00
[52] U.S. Cl. .................................. 184/1 E; 184/15 R; 184/105 R
[58] Field of Search ............... 184/15 R, 15 A, 15 B, 184/105, 1 D, 1 C, 6.19, 84, 94, 105 R, 1 E; 305/58 R, 59 R; 74/257; 308/120

[56] References Cited

U.S. PATENT DOCUMENTS

| 1,863,858 | 6/1932 | Knox | 305/59 |
| 1,956,580 | 5/1934 | Knox | 305/59 |
| 1,973,214 | 9/1934 | Lamb | 305/59 |
| 2,481,784 | 9/1949 | Roman | 305/59 |
| 3,144,916 | 8/1964 | Lien | 184/15 R |
| 3,336,089 | 8/1967 | Krickler | 305/59 |
| 3,762,778 | 10/1973 | Boggs | 305/59 |

*Primary Examiner*—Samuel Feinberg
*Attorney, Agent, or Firm*—August E. Roehrig, Jr.; Robert A. Brown

[57] ABSTRACT

A track pin and track link bushing lubrication system wherein lubricant is carried within the track pin for use in lubricating the track pin and track link bushing joint. The track pin is formed with a lubricant retaining cavity sealed such that the lubricant supply may be readily replenished in the field without requiring a replacement seal.

11 Claims, 3 Drawing Figures

TRACK LINK HINGE JOINT LUBRICATING SYSTEM

BACKGROUND OF THE INVENTION

This invention relates in general to a lubricating system and, in particular, to a lubricating system for lubricating a track link hinge joint at the contact surface between a track pin and a track link bushing.

More specifically this invention relates to a track link hinge joint lubricating system wherein the supply of lubricant is contained within a sealed track pin and can be quickly and easily replenished in the field without necessitating replacing any parts of the lubricating system.

Track-type vehicles are frequently used under conditions wherein the terrain is such that a track is required to enable vehicle operation. These vehicles utilize a plurality of track links connected into two parallel endless chains at a track link hinge joint. Track pins span the space between the parallel sides of the links joining complementary ends of adjacent links. One end of each track link is formed with a track link bushing through which the track pin passes to join adjacent links for permitting relative pivotal movement therebetween.

In typical track-type vehicle operational environment, for example sand, dust or mud, much abrasive material is present which creates severe wear problems on the track components. This operational atmosphere causes the track link hinge joint to wear due to entry of abrasive material into the joint which increases surface abrasion of the relatively movable parts shortening operating life. Great stresses are exerted upon the track chains and, therefore, the track link hinge joints by the extremely heavy load supported by the track chain and the nature of the terrain over which the track-type vehicles commonly operate. Under these conditions the track joints are extremely susceptible to the abrasive material wear.

Various attempts have been made to increase the life of the track link hinge joint by such means as improved metallurgy and hermetic sealing and lubricating the joints. However, production costs of such systems have been such that these solutions are not commercially satisfactory. Seals have been developed which protect, with varying degrees of effectiveness, against the entry of abrasives into the track link hinge joint and retain lubricant within the joint to minimize abrasion between the track pin and the track link bushing. Bores in the track pin have been used for retaining and storing lubricant, but precision machining costs and in-the-field machine downtime, which has been heretofore required for replenishing the lubricant within the track pin, have rendered such systems unsatisfactory. Threaded and pressed-in steel plugs have been used but the material cost, and time and trouble in removing worn and corroded plugs when servicing the track links in the field, are both prohibitive and impractical. Other types of plug systems have also been utilized, but require the replacement of a component of the seal assembly when replenishing the lubricant. Such systems are undesirable since they require maintaining a supply of replacement parts for field servicing.

Other problems are created when using a bore formed in the track pin to retain lubricant. Air trapped within the track pin cavity is compressed by the addition of lubricant so that the internal pressure within the cavity increases expelling lubricant from the track pin cavity upon the removal of the lubricant nozzle. Since the lubricant cavity is not vented to atmosphere when lubricant is added, many times an inadequate supply of lubricant results.

SUMMARY OF THE INVENTION

It is, therefore, an object of this invention to improve track link hinge joint lubrication systems.

Another object of this invention is to maintain a replenishable supply of lubricant in the track link joints without requiring the replacement of seals or lubrication plugs.

A further object of this invention is to minimize machine downtime required for field lubrication of track link joints.

Still another object of this invention is to uniformly fill the lubricant retaining cavity of the track pin.

These and other objects are attained in accordance with the present invention wherein there is provided a sealed track pin and track link bushing lubrication system wherein lubricant is carried within the track pin and is readily replenished in the field without requiring a replacement seal.

DESCRIPTION OF THE DRAWINGS

Further objects of the invention, together with additional features contributing thereto and advantages accruing therefrom will be apparent from the following description of one embodiment of the invention when read in conjunction with the accompanyin drawings, wherein.

DESCRIPTION OF A PREFERRED EMBODIMENT

Figure 1:
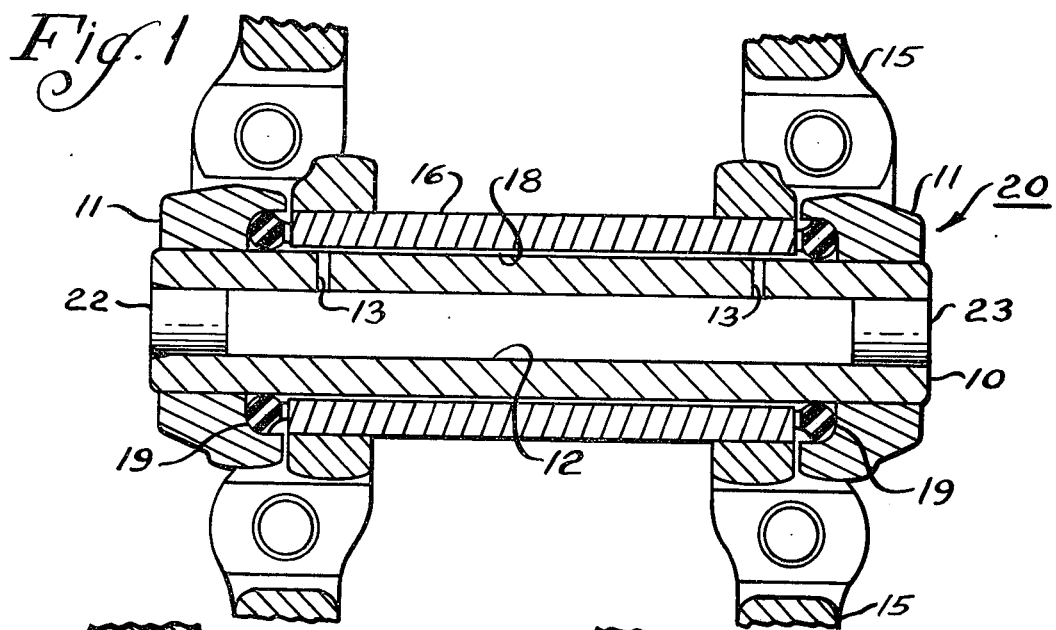
FIG. 1 is a cross-sectional view of a track link hinge joint taken along the axis of the track pin showing the track link joint in a serviced condition.

Referring now to FIG. 1 there is shown a track link hinge joint 20 formed by a track pin 10 articulately coupling spaced track links 15 which carry ground engaging track shoes (not shown) to form an endless track for supporting a vehicle. The track pin 10 couples adjacent track links, one to the other, and permits relative pivotal movement between the links through the coupling of track link bushings 16, fixedly secured at one end of each track link, to the adjacent track link through track pin 10 fixedly secured in complementary end portions 11 of the adjacent link. Since relative movement between the track link bushing 16 and the track pin 10 is necessary for operation of the track laying vehicle, suitable lubricant must be provided in a space 18 defined by the outer surface of the track pin 10 and the inner surface of the track link bushing 16 to prevent metal-to-metal contact for minimizing wear and frictional losses as well as reducing the noise level of the machine operation.

The track pin 10 has a rifle drilled hole or bore 12 traversing the length of the pin at the approximate center line or axis to form a lubricant retaining cavity. A pair of cross-drilled holes 13, formed in the wall of the track pin, allow communication between the bore 12 in the center of the pin and the outer surface thereof at a point adjacent to the inner surface of the track link bushing 16. When lubricant is added to the lubricant cavity 12 of the track pin, the lubricant will move outwardly through the cross-drilled linking holes 13 into the space 18 formed between the outer surface of the track pin 10 and the inner surface of the track link bushing 16 providing a film of lubricant to prevent metal-to-metal contact between the pin and bushing. A pair of seals 19 are positioned adjacent the outer end of the track link bushing 16 to provide a lubricant proof seal between the track pin and the track link bushing. The seals 18 maintain the lubricant between the outer surface of the track pin and the adjacent inner surface of the track link bushing and prevent abrasive materials from entering between these surfaces. A pair of resilient elastomeric plugs 22 and 23, which are of a material not deleteriously affected by the lubricant, are secured in both ends of the track pin 10 to seal the lubricant containing cavity 12.

Figure 2:
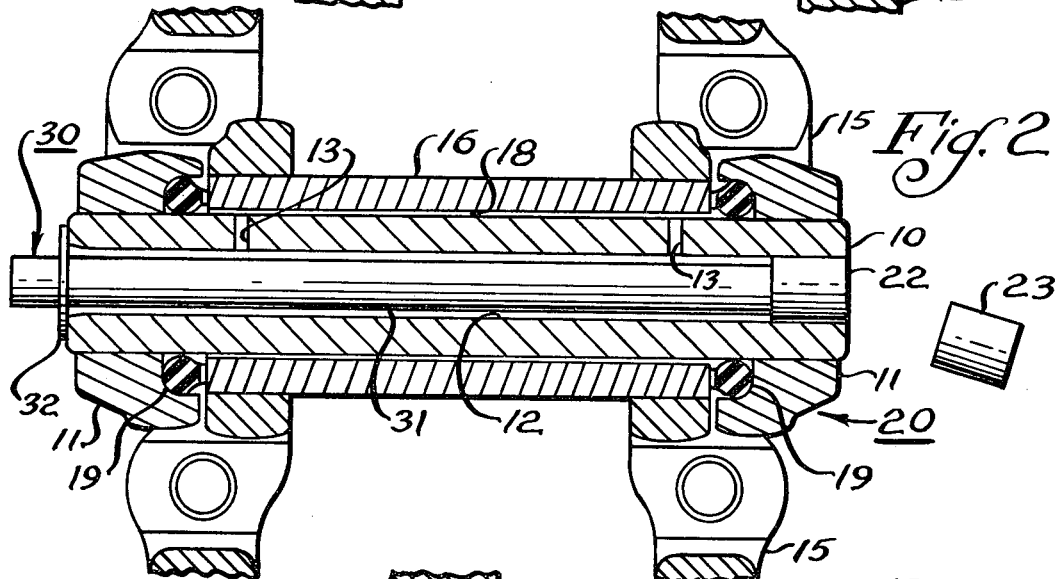
FIG. 2 is a cross-sectional view of a track link hinge joint taken along the axis of the track pin showing the track link hinge joint during field servicing in preparation for new lubricant to be added to the track pin cavity.

After a period of operation, it becomes desirable or necessary to replenish or replace the lubricant retained within the track pin cavity 12. Referring to FIG. 2, access to the lubricant cavity 12, to replenish or replace the lubricant, is accomplished by a plug driving tool 30 formed as a cylindrical rod 31 of a diameter slightly less than that of the internal bore and extending a length equal to that of the track pin less the length of one of the equal size plugs 22 or 23. A roll pin or suitable stop 32 is secured in the plug driving tool to insure that the tool, when inserted in the track pin 10, extends only this predetermined length for a purpose to be hereinafter described in detail.

Replenishment of the lubricant within the track pin lubricant cavity 12 is accomplished by utilizing the plug driving tool 30 to drive one of the plugs 22 or 23 through the internal bore or lubricant cavity in the track pin 10 into the position previously occupied by the plug at the opposite end of the bore 12. While repacking can be effected from either side of the track pin 10, in FIG. 2 the plug driving tool 30 has been inserted from the left end and has driven plug 22 from the left to the right side into the position of and replacing plug 23. Plug 23 is removed by this action and can be reinserted from the left end in the position of and replacing plug 22 to again close the lubricant cavity 12 after repacking. The roll pin or stop 32 for the plug driving tool 30 is positioned to insure that the length of the driving tool inserted into the track pin 10 will position plug 22 in the same position as formerly occupied by plug 23. The bore 12 of track pin is then ready for replacement of the lubricant.

New lubricant is added to the lubricant chamber 12 by means of a lubricant nozzle 40 which is inserted into the track pin lubrication cavity through the open end. The lubrication nozzle is inserted into the open end of the cavity 12 and lubricant added until such time as the lubricant begins to pass from an overflow port 41 in the lubricant nozzle indicating that the internal chamber 12 has been filled. The lubricant nozzle 40 is then removed from the lubricant cavity 12 and plug 23 inserted to reseal the cavity.

Since the lubrication nozzle is vented to the atmosphere, removal of the nozzle from the cavity will not cause the lubricant to be blown from the cavity due to internal pressure within the track pin bore 12. Internal pressure within the track pin cavity 12 can also create a plug of lubricant which would appear to indicate that the track pin cavity 12 is full when in fact the cavity is empty except for the plug of lubricant so formed. The track pin lubrication nozzle 40 prevents such pressure build-up by venting the chamber 12 to atmosphere.

The lubrication nozzle 40 is formed with a stepped or insert portion 42 of a diameter slightly less than the internal bore of the lubricant chamber 12 and extending a length determined by a shoulder 49 formed on the nozzle. The insert portion 42 includes a pair of spaced lands 43 each carrying "O" rings or other suitable seal 44 for forming a lubricant tight sealing relationship between the internal surfaces of the lubricant chamber 21 and the seal rings 44. A stepped portion 45 formed by the two lands is in communication with a longitudinally extending bore 46, and outer portion of which (47) is adapted for coupling to a suitable lubricant supply, not shown.

Figure 3:
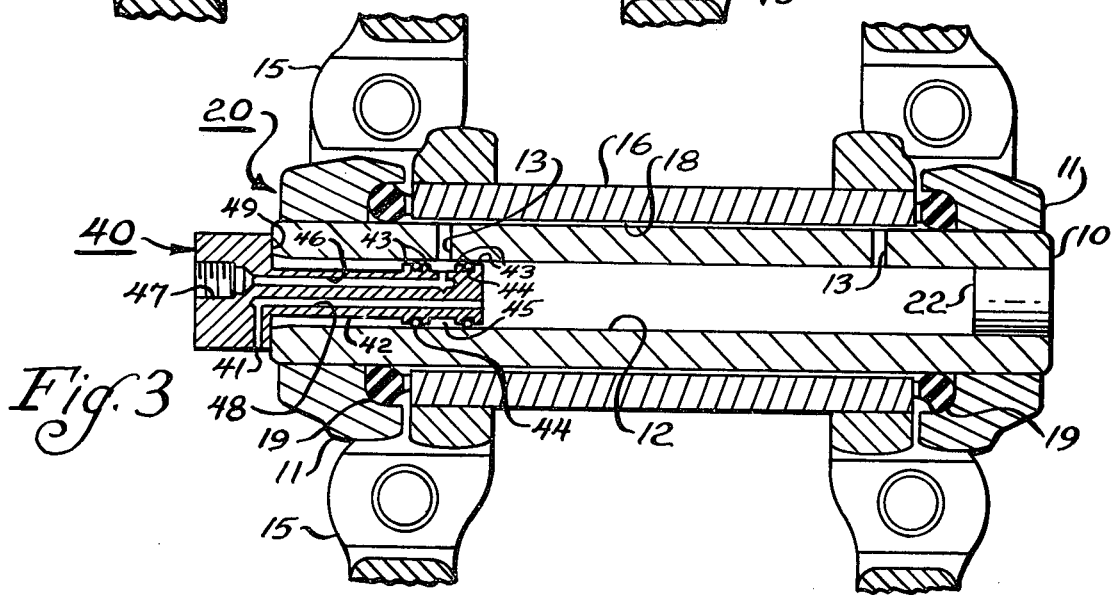
FIG. 3 is a cross-sectional view of a track link hinge joint taken along the axis of the track pin showing a lubrication nozzle and the manner in which the lubricant within the track pin is replenished during servicing.

As shown in FIG. 3, when the nozzle 40 is inserted into the lubricant cavity until the shoulder 49 engages the outer edge of the track pin 10, the stepped portion 45 is adjacent one of the cross-drilled holes 13 in the track pin. As lubricant is introduced through the bore 46 into communication with the step portion 45 it passes through the cross-drilled hole 13 into the internal space 18 between the track pin and bushing. The lubricant passes the length of the bushing until it re-enters the lubricant cavity through the other cross-drilled hole in the track pin. When the lubricant cavity 12 of the track pin is filled, lubricant then passes through a second bore 48 extending axially from the inner end of the insert portion 42 until it passes out through the exhaust port 41 to indicate that the entire chamber 12 has been filled.

When the chamber 12 has been filled, the lubrication nozzle 40 is withdrawn from the track pin cavity and plug 23 which had previously been removed by being driven through the track pin bore is reinserted into the open end of the track pin to seal the lubrication cavity.

Withdrawal of the nozzle from the cavity and insertion of the plug 23 provide a slight positive pressure within the track pin cavity due to a slight difference in spacing, insufficient to expel plug 22 from the opposite end, but sufficient to insure proper flow of lubricant into the space 18 between the pin and bushing.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. In a track hinge joint wherein track links are joined one to the other by means of track pins secured to one track link and passing through a track link bushing carried by an adjacent track link to pivotally connect one track link to the other the improvement comprising
a lubricant retaining bore extending axially through said track pin, aperture means extending through said track pin from said bore to the outer surface thereof adjacent said track link bushing, and sealing means for closing the ends of said bore to retain lubricant therein, said sealing means movable from a first sealing position adjacent an end of said track pin through said lubricant retaining bore formed therein to a second sealing position adjacent an opposite end of said track pin.

2. A track hinge joint for pivotal interaction between adjacent track links including a track pin secured between outer ends of a first track link, a bearing surface carried by the inner ends of a second track link and co-axially supported about said track pin in direct contact therewith inwardly of the outer ends of said first track link, said track pin having a bore extending axially therethrough for retaining a quantity of lubricant and aperture means extending from said bore to the outer surface of said track pin adjacent said bearing surface to pass lubricant therethrough, and sealing means for closing the ends of said track pin bore to retain lubricant therein, said sealing means movable from a sealing position adjacent one end of said axial bore extending through said track pin, and through said axial extending bore to a sealing position adjacent the opposite end of said bore.

3. A track hinge joint lubrication system comprising a pair of track links having adjacent complementary portions for pivotal joinder of one link to the other, one of said complementary portions including bushing means forming a wear resistant bearing surface, a track pin secured to a complementary portion of one track link and passing through the bushing means of said complementary portion of the other track link thereby joining said links for relative pivotal movement, said track pin having a bore extending axially therethrough for retaining a quantity of lubricant and passage means extending from said bore to the outer surface of said track pin adjacent said bushing means for passing lubricant thereto, and sealing means for closing the open ends of said bore to retain lubricant therein, said sealing means movable from a sealing position adjacent a first end of said track pin and through said bore extending axially therethrough to a sealing position adjacent a second end of said track pin.

4. The apparatus of claim 3 wherein said sealing means comprises a plug positioned within each end of the bore extending axially through said track pin.

5. The apparatus of claim 4 wherein said track pin passage means comprises radially extending bores formed therein between the plugs positioned within said ends for sealing the bore.

6. The apparatus of claim 5 wherein a radially extending bore is formed adjacent each sealing plug.

7. A method of relubricating a track link hinge joint formed by adjacent track links connected for pivotal interaction by means of a track pin carried by one link extending co-axially through a bushing carried by an adjacent track link, wherein the track pin has a lubricant retaining bore extending axially therethrough with passages extending from said bore to the outer surface of the track pin adjacent said bushing for passing lubricant from the bore to lubricate said surface and seals positioned within each end of the bore for retaining lubricant therein, the steps comprising passing a first seal positioned at one end of the bore through said bore into the position of a second seal at the opposite end thereof expelling said second seal from the bore so that the bore is open at one end, inserting lubricant into the bore through the open end thereof, and sealing the open end of the bore to retain the lubricant therein.

8. The method of claim 7 wherein the step of sealing the open end of the bore comprises placing the expelled plug in the open end thereof to close the bore.

9. The method of claim 7 wherein the step of inserting lubricant into the bore comprises passing lubricant from the bore through a passage extending from the bore to the outer surface of the track pin adjacent to the bushing, and passing lubricant over the surface of the track pin adjacent the bushing and through a passage extending from the outer surface of the track pin into the bore.

10. A lubrication nozzle for adding lubricant into a cavity closed by insertion of the nozzle thereinto comprising a nozzle adapted to be coupled to a source of lubricant and having a cavity insert portion of a predetermined length and stop means to define the length of said portion inserted into the cavity, passage means formed in said nozzle for communicating a source of lubricant with the interior of said cavity through an injection opening, seal means carried by said cavity insert portion adjacent said injection opening to form a lubricant tight seal upon the insertion of the nozzle into the cavity, and discharge means formed in said nozzle for communicating with the interior of the cavity through said nozzle for discharging excess lubricant injected into the cavity.

11. The apparatus of claim 10 wherein said seal means carried by said insert portion are positioned about said injection opening to form a lubricant tight seal with the interior of said cavity upon the insertion of the nozzle thereinto.

* * * * *